(12) United States Patent
Abbe et al.

(10) Patent No.: US 12,445,740 B1
(45) Date of Patent: Oct. 14, 2025

(54) IMAGE CAPTURE DEVICE WITH MULTIPLE COLOR MODES

(71) Applicant: GoPro, Inc., San Mateo, CA (US)

(72) Inventors: Guillaume Abbe, Paris (FR); Sandra Vitorino, Antony (FR)

(73) Assignee: GoPro, Inc., San Mateo, CA (US)

( * ) Notice: Subject to any disclaimer, the term of this patent is extended or adjusted under 35 U.S.C. 154(b) by 105 days.

(21) Appl. No.: 18/403,535

(22) Filed: Jan. 3, 2024

(51) Int. Cl.
*H04N 23/85* (2023.01)
*H04N 23/51* (2023.01)
*H04N 23/55* (2023.01)
*H04N 23/88* (2023.01)

(52) U.S. Cl.
CPC ............. *H04N 23/85* (2023.01); *H04N 23/51* (2023.01); *H04N 23/55* (2023.01); *H04N 23/88* (2023.01)

(58) Field of Classification Search
CPC ........ H04N 23/85; H04N 23/51; H04N 23/88; H04N 23/55
USPC ...................................................... 348/223.1
See application file for complete search history.

(56) References Cited

U.S. PATENT DOCUMENTS

2022/0174249 A1* 6/2022 Hua .......................... H04N 9/78

\* cited by examiner

*Primary Examiner* — Joel W Fosselman
(74) *Attorney, Agent, or Firm* — Esplin & Associates, PC

(57) ABSTRACT

An image capture device may capture images/video frames during a capture duration. During capture of the images/video frames, the image capture device may utilize capture parameters (e.g., ISO, exposure time, color temperature) to determine, for the images/video frames, different multi-color correction matrices for different color modes of the image capture device. After the capture of the images/video frames, the multi-color correction matrices may be used to modify the images/video frames so that the modified images/video frames appear to have been captured using the corresponding color mode.

20 Claims, 5 Drawing Sheets

IMAGE CAPTURE DEVICE WITH MULTIPLE COLOR MODES

FIELD

This disclosure relates to usage of multiple color modes of an image capture device via generation of different multi-color correction matrices for different color modes during capture of visual content.

BACKGROUND

An image capture device may capture images using a particular color mode. Changing the look of the images to simulate the look of other color modes may be difficult and time consuming. The simulated look of other color modes may not match the actual look the images would have had if they had been captured using the other color modes.

SUMMARY

This disclosure relates to an image capture device with multiple color modes. The image capture device may include a housing. The housing may carry one or more of an optical element, an image sensor, and/or other components. The optical element may guide light within a field of view to the image sensor. The image sensor may generate a visual output signal conveying visual information based on light that becomes incident thereon. The visual information may define visual content.

The image capture device may be operated in different color modes. The different color modes may define different processing of the visual content for image generation. The different color modes may include a first color mode, a second color mode, and/or other color modes. The visual content may be captured based on a set of capture parameters. The set of capture parameters may include light sensitivity, exposure time, color temperature, and/or other capture parameters. During capture of the visual content, different multi-color correction matrices may be determined for the different color modes based on the set of capture parameters and/or other information. A given multi-color correction matrix may define color transformation of an input color value to an output color value. A first multi-color correction matrix is determined for the first color mode, a second multi-color correction matrix is determined for the second color mode, and/or other multi-color correction matrices may be determined for other color modes. A set of images may be generated from the captured visual content by applying one or more of the different multi-color correction matrices.

A housing may carry one or more components of an image capture device. The housing may carry (be attached to, support, hold, and/or otherwise carry) one or more of an electronic storage, an optical element, an image sensor, a processor, and/or other components.

The electronic storage may store information relating to the image capture device, information relating to components of the image capture device, visual information, information relating to visual content captured by the image capture device, information relating to color modes, information relating to capture parameters, information relating to multi-color correction matrices, information relating to images, and/or other information.

The optical element may be configured to guide light within a field of view to the image sensor. The field of view may be less than 180 degrees. The field of view may be equal to 180 degrees. The field of view may be greater than 180 degrees.

The image sensor may be configured to generate a visual output signal and/or other output signals based on light that becomes incident thereon and/or other information. The visual output signal may convey visual information and/or other information. The visual information may define visual content having the field of view.

The processor(s) may be configured by machine-readable instructions. Executing the machine-readable instructions may cause the processor(s) to facilitate usage of multiple color modes of an image capture device. The machine-readable instructions may include one or more computer program components. The computer program components may include one or more of a color mode component, a capture component, a multi-color correction matrix component, a generation component, and/or other computer program components.

The color mode component may be configured to operate the image capture device in different color modes. The different color modes may define different processing of the visual content for image generation. The different color modes may include a first color mode, a second color mode, and/or other color modes.

The capture component may be configured to capture the visual content based on a set of capture parameters and/or other information. The set of capture parameters may include light sensitivity, exposure time, color temperature, and/or other capture parameters.

The multi-color correction matrix component may be configured to, during capture of the visual content, determine different multi-color correction matrices for the different color modes based on the set of capture parameters and/or other information. A given multi-color correction matrix may define color transformation of an input color value to an output color value. A first multi-color correction matrix may be determined for the first color mode, a second multi-color correction matrix may be determined for the second color mode, and/or other multi-color correction matrices may be determined for other color modes.

In some implementations, determination of the different multi-color correction matrices for the different color modes during the capture of the visual content may reduce the amount of information and the amount of processing needed to simulate different color modes on images.

In some implementations, separate values of a given multi-color correction matrix may be determined for different moments during the capture of the visual content.

In some implementations, the different multi-color correction matrices for the different color modes may be stored as image metadata.

The generation component may be configured to generate one or more sets of images from the captured visual content by applying one or more of the different multi-color correction matrices. In some implementations, different sets of images may be generated from the captured visual content by applying different multi-color correction matrices. A first set of images may be generated from the captured visual content by applying the first multi-color correction matrix. A second set of images may be generated from the captured visual content by applying the second multi-color correction matrix.

In some implementations, a given set of images may form some or all video frames of a video.

In some implementations, a first set of images may be generated by applying the first multi-color correction matrix for presentation on an electronic display during the capture of the visual content. A second set of images may be generated by not applying any of the different multi-color correction matrices for storage in an electronic storage.

In some implementations, a new set of images may be generated from an existing set of images by applying a different multi-color correction matrix. The existing set of images may be generated by not applying any multi-color correction matrix.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
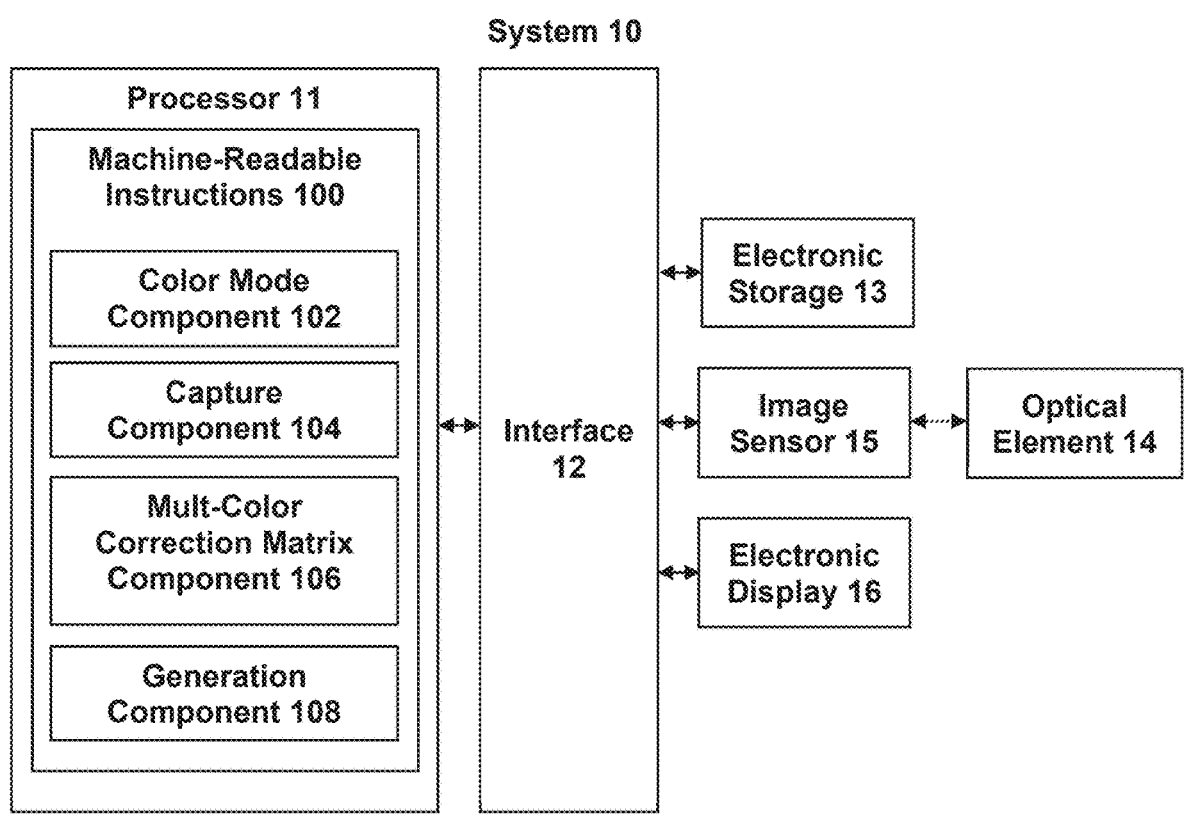
FIG. 1 illustrates an example system for facilitating usage of multiple color modes of an image capture device.

FIG. 1 illustrates a system 10 for facilitating usage of multiple color modes of an image capture device. The system 10 may include one or more of a processor 11, an interface 12 (e.g., bus, wireless interface), an electronic storage 13, an optical element 14, an image sensor 15, an electronic display 16, and/or other components. The system 10 may include and/or be part of an image capture device. The image capture device may include a housing, and one or more of the electronic storage 13, optical element 14, the image sensor 15, the electronic display 16, and/or other components of the system 10 may be carried by the housing of the image capture device. The optical element 14 may guide light within a field of view to the image sensor 15. The image sensor 15 may generate a visual output signal conveying visual information based on light that becomes incident thereon. The visual information may define visual content.

The image capture device may be operated in different color modes by the processor 11. The different color modes may define different processing of the visual content for image generation. The different color modes may include a first color mode, a second color mode, and/or other color modes. The visual content may be captured by the processor 11 based on a set of capture parameters. The set of capture parameters may include light sensitivity, exposure time, color temperature, and/or other capture parameters. During capture of the visual content, different multi-color correction matrices may be determined by the processor 11 for the different color modes based on the set of capture parameters and/or other information. A given multi-color correction matrix may define color transformation of an input color value to an output color value. A first multi-color correction matrix is determined for the first color mode, a second multi-color correction matrix is determined for the second color mode, and/or other multi-color correction matrices may be determined for other color modes. A set of images may be generated by the processor 11 from the captured visual content by applying one or more of the different multi-color correction matrices.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to the image capture device, information relating to components of the image capture device, visual information, information relating to visual content captured by the image capture device, information relating to color modes, information relating to capture parameters, information relating to multi-color correction matrices, information relating to images, and/or other information The electronic storage 13 may include non-transitory, machine-readable storage media. The non-transitory machine-readable storage media may include permanent memory and/or temporary memory. The electronic storage 13/the non-transitory, machine-readable storage media may store information defining content that has been captured by the image capture device.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, the term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, the electronic storage 13, the optical element 14, the image sensor 15, and/or the electronic display 16 of the system 10 may be carried by the housing of the image capture device. The electronic display 16 may be an electronic display of the image capture device or an electronic display of another computing device (e.g., mobile device paired with the image capture device). The housing of the image capture device may carry other components of the system 10, such as the processor 11. References to a housing of an image capture device may refer to the image capture device, and vice versa.

An image capture device may refer to a device that captures visual content. An image capture device may capture visual content in the form of images, videos, and/or other forms. An image capture device may refer to a device for recording visual information in the form of images, videos, and/or other media. An image capture device may capture other content, such as audio content using one or more sound sensors. An image capture device may capture metadata (e.g., position data, movement data) relating to the visual content and/or audio content. An image capture device may be a standalone device (e.g., camera, action camera, image sensor) or may be part of another device (e.g., part of a smartphone, tablet).

Figure 3:
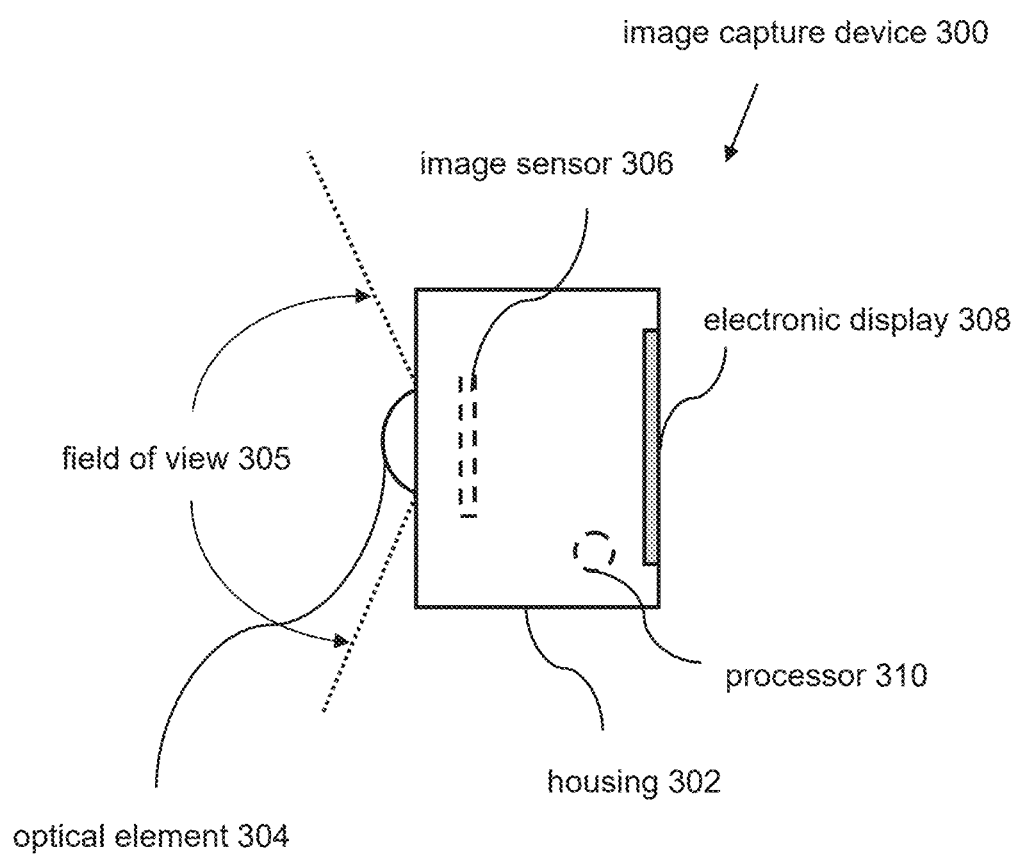
FIG. 3 illustrates an example image capture device.

FIG. 3 illustrates an example image capture device 300. Visual content (e.g., of image(s), video frame(s)), audio content, metadata relating to the visual content and/or audio content, and/or other content may be captured by the image capture device 300. The image capture device 300 may include a housing 302. The housing 302 may refer a device (e.g., casing, shell) that covers, protects, and/or supports one or more components of the image capture device 300. The housing 302 may include a single-piece housing or a multi-piece housing. The housing 302 may carry one or more components of the image capture device 300. The housing 302 may carry (be attached to, support, hold, and/or otherwise carry) one or more of an optical element 304, an image sensor 306, an electronic display 308, a processor 310, and/or other components.

One or more components of the image capture device 300 may be the same as, be similar to, and/or correspond to one or more components of the system 10. For example, the processor 310 may be the same as, be similar to, and/or correspond to the processor 11. The optical element 304 may be the same as, be similar to, and/or correspond to the optical element 14. The image sensor 306 may be the same as, be similar to, and/or correspond to the image sensor 15. The electronic display 308 may be the same as, be similar to, and/or correspond to the electronic display 16.

The image capture device 300 may include other components not shown in FIG. 3. The image capture device 300 may not include one or more components shown in FIG. 3. For example, the image capture device 300 may include one or more sound sensors. Other configurations of image capture devices are contemplated.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306.

The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view of 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than 180-degrees. In some implementations, the field of view 305 may be less than 180-degrees. In some implementations, the field of view 305 may be equal to 180-degrees.

In some implementations, the image capture device 300 may include multiple optical elements. For example, the image capture device 300 may include multiple optical elements that are arranged on the housing 302 to capture spherical images/videos (guide light within spherical field of view to one or more images sensors). For instance, the image capture device 300 may include two optical elements positioned on opposing sides of the housing 302. The fields of views of the optical elements may overlap and enable capture of spherical images and/or spherical videos.

The image sensor 306 may include sensor(s) that converts received light into output signals. The output signals may include electrical signals. The image sensor 306 may generate output signals conveying information that defines visual content of one or more images and/or one or more video frames of a video. For example, the image sensor 306 may include one or more of a charge-coupled device sensor, an active pixel sensor, a complementary metal-oxide semiconductor sensor, an N-type metal-oxide-semiconductor sensor, and/or other image sensors.

The image sensor 306 may be configured to generate output signals conveying information that defines visual content of one or more images and/or one or more video frames of a video. The image sensor 306 may be configured to generate a visual output signal based on light that becomes incident thereon during a capture duration and/or other information. The visual output signal may convey visual information that defines visual content having the field of view. The optical element 304 may be configured to guide light within the field of view 305 to the image sensor 306, and the image sensor 306 may be configured to generate visual output signals conveying visual information based on light that becomes incident thereon via the optical element 304.

The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of the image. Other types of visual information are contemplated.

Capture of visual content by the image sensor 306 may include conversion of light received by the image sensor 306 into output signals/visual information defining visual content. Capturing visual content may include recording, storing, and/or otherwise capturing the visual content for use in generating video content (e.g., content of video frames). For example, during a capture duration, the visual output signal generated by the image sensor 306 and/or the visual information conveyed by the visual output signal may be used to record, store, and/or otherwise capture the visual content for use in generating video content.

In some implementations, the image capture device 300 may include multiple image sensors. For example, the image capture device 300 may include multiple image sensors carried by the housing 302 to capture spherical images/videos based on light guided thereto by multiple optical elements. For instance, the image capture device 300 may include two image sensors configured to receive light from two optical elements positioned on opposing sides of the housing 302. The fields of views of the optical elements may overlap and enable capture of spherical images and/or spherical videos.

The image capture device 300 may include other sensors. For example, the image capture device 300 may include one or more sound sensors to capture audio content. A sound sensor may include sensor(s) (e.g., microphone, component(s) of microphone) that converts received sounds into output signals. The output signals may include electrical signals. The sound sensor may generate output signals conveying information based on sounds received by the sound sensor. For example, the sound sensor may be configured to generate an audio output signal conveying audio information based on the sounds received by the sound sensor. The audio information may define audio content. The audio information may define audio content by including information that defines one or more content, qualities, attributes, features, and/or other aspects of the audio content. For example, the audio information may define audio content by including information that makes up the content of the audio, and/or information that is used to determine the content of the audio. The audio content may include one or more reproductions of the received sounds. The audio information may define audio content in one or more formats, such as WAV, MP3, MP4, RAW, and/or other formats.

The image capture device 300 may include one or more location sensors (e.g., GPS sensors) to measure location of the image capture device and/or one or more position sensors (e.g., gyroscope, accelerometer, inertial measurement unit) to measure position, movement, and/or orientation of the image capture device. In some implementations, information about location, position, and/or movement of the image capture device may be stored as metadata of other content (e.g., visual content, audio content) captured by the image capture device.

The electronic display 308 may include an electronic device that provides visual presentation of information. The electronic display 308 may include a color display and/or a non-color display. The electronic display 308 may be configured to visually present information. The image capture device 300 may include multiple electronic displays.

The electronic display 308 may be configured to present visual content, graphical user interface, and/or other information. A graphical user interface may include a graphical form that enables a user to interact with the image capture device 300 and/or see information provided by the image capture device 300. A graphical user interface may include one or more interface elements. The interface element(s) may enable presentation of information to the user and/or reception of user input to control the image capture device 300.

A processor may include one or more processors (logic circuitry) that provide information processing capabilities in the image capture device. The processor may provide one or more computing functions for the image capture device. The processor may operate/send command signals to one or more components of the image capture device to operate the image capture device. For example, referring to FIG. 3, the processor 310 may facilitate operation of the image capture device 300 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture).

The processor 310 may obtain information from the image sensor 306 and/or facilitate transfer of information from the image sensor 306 to another device/component. The processor 310 may obtain information from other sensor(s) and/or facilitate transfer of information from other sensor(s) to another device/component. The processor 310 may be remote from the processor 11 or local to the processor 11. One or more portions of the processor 310 may be remote from the processor 11 and/or one or more portions of the processor 10 may be part of the processor 310. The processor 310 may include and/or perform one or more functionalities of the processor 11 shown in FIG. 1.

An image capture device may be operated in different color modes. A color mode of an image capture device may refer to a mode of operation of the image capture device that controls how visual content captured by the image capture device is processed. A color mode of an image capture device may refer to a mode of operation of the image capture device that determines how the visual content captured by the image capture device is rendered for presentation and/or storage. A color mode of an image capture device may define a particular processing of the visual content for image generation. Application of a color mode to visual content may be referred to as color grading. Application of different color modes may result in the captured visual content having different looks. For example, usage of a flat color mode may result in flat images (e.g., single images, burst images, video frames) while usage of a vibrant color mode may result in vibrant (high contrast, punchy) images.

Flat images may be processed to simulate the look the images would have had if they had been captured by the image capture device using a particular color mode. For example, image processing software may be used to change the curves, brightness, contrast, saturation, temperature, white balance, and/or other visual aspects of the images so that they look visually similar to images captured using a vibrate color mode.

Such post-processing of images may be difficult and time-consuming. Additionally, such post-processing of images may fail to precisely match the visual characteristics of images captured using a particular color mode because the application of a color mode by the image capture device to the captured images may be dynamic. For example, the image capture device may apply a particular color mode to captured images on a sub-grouping of images (every n images), while post-processing of images to simulate the look of the particular color mode may apply a global change to the images. With changes in capture conditions, the image capture device may apply the color mode differently to images captured at different times, while the post-processing of images to simulate the look of the particular color mode may apply the same global change to all of the images.

The present disclosure enables a color mode to be accurately applied to images after capture. The post-capture application of a color mode to images may include dynamic application of the color mode to the images. The post-capture application of the color mode may result in the images having the same look as if the images were captured by the image capture device using the color mode. An image capture device may capture images during a capture duration. During capture of the images, the image capture device may utilize capture parameters (e.g., ISO, exposure time, color temperature) to determine, for individual images or for groups of images, different multi-color correction matrices for different color modes of the image capture device. The multi-color correction matrices for different color modes may be stored as metadata of the images. After the capture of the images, the multi-color correction matrices may be used to modify the images so that the modified images appear to have been captured using the corresponding color mode. Color grading for different color modes may be determined by the image capture device for application after the images have been captured. Determination of the multi-color correction matrices during the capture of the image may reduce the amount/size of information that is needed to apply a particular color mode after capture. Determination of the multi-color correction matrices during the capture of the image may reduce the amount of time and/or computational resources needed to apply a particular color mode after capture.

Figure 4:
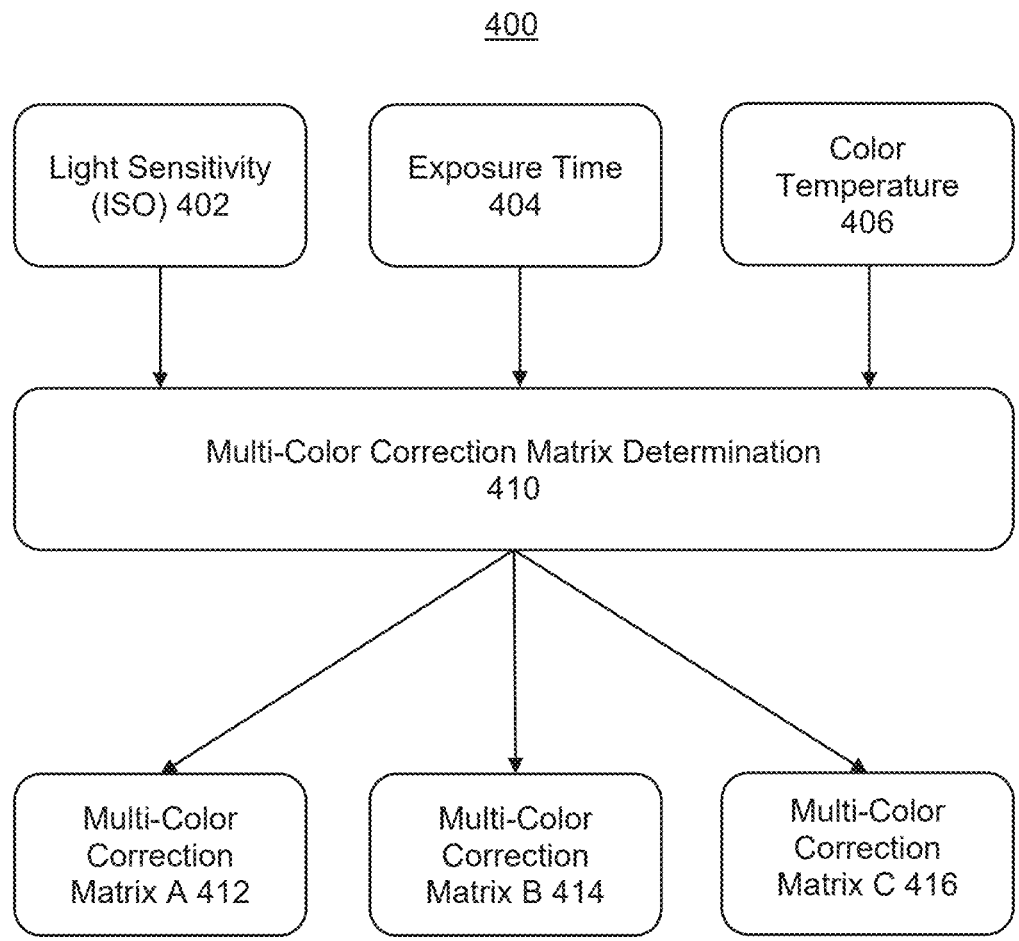
FIG. 4 illustrates an example flowchart for multi-color correction matrix determination.

FIG. 4 illustrates an example flowchart 400 for multi-color correction matrix determination. During capture of visual content of images, light sensitivity (ISO) 402, exposure time 404, and color temperature 406 of the images may be obtained. The light sensitivity (ISO) 402, the exposure time 404, and the color temperature 406 may be obtained per individual images or per groups of images. The light sensitivity (ISO) 402 and the exposure time 404 may be an image sensor parameters for capturing the images. The values of the light sensitivity (ISO) 402 and the exposure time 404 may be manually or automatically set. The color temperature 406 may be computed by an auto white balance tool/algorithm of the image capture device. The color temperature 406 may depend on the illuminant (e.g., the Sun, lighting type) of the scene captured within the images. The values of the light sensitivity (ISO) 402, the exposure time 404, and the color temperature 406 may vary during a capture duration. For example, different video frames captured at different moments may have different values of the light sensitivity (ISO) 402, the exposure time 404, and the color temperature 406.

With the light sensitivity (ISO) 402, the exposure time 404, the color temperature 406, and/or other capture parameters, multi-color correction matrix determination 410 may be performed. The multi-color correction matrix determination 410 may be performed during capture of the images. Different multi-color correction matrices may be determined for different color modes in which the image capture device may operate. For example, a multi-color correction matrix A 412 may be determined for a color mode A of the image capture device, a multi-color correction matrix B 414 may be determined for a color mode B of the image capture device, and multi-color correction matrix C 416 may be determined for a color mode C of the image capture device.

A multi-color correction matrix may define color transformation of an input color value to an output color value. A multi-color correction matrix may define how a particular color/color value should be transformed/changed for presentation/storage. A multi-color correction matrix may be used to transform the color values of the images. A multi-color correction matrix may be used to apply color grading to the images. Separate values of a multi-color correction matrix may be determined for different images/groups of images. For example, while recording a video, separate values of multiple multi-color correction matrices may be determined for individual video frames. The values of a multi-color correction matrix determine for a particular video frame may depend on the values of light sensitivity (ISO) 402, the exposure time 404, and the color temperature 406 of the particular video frames, preceding video frames, and/or subsequent video frames.

Figure 5:
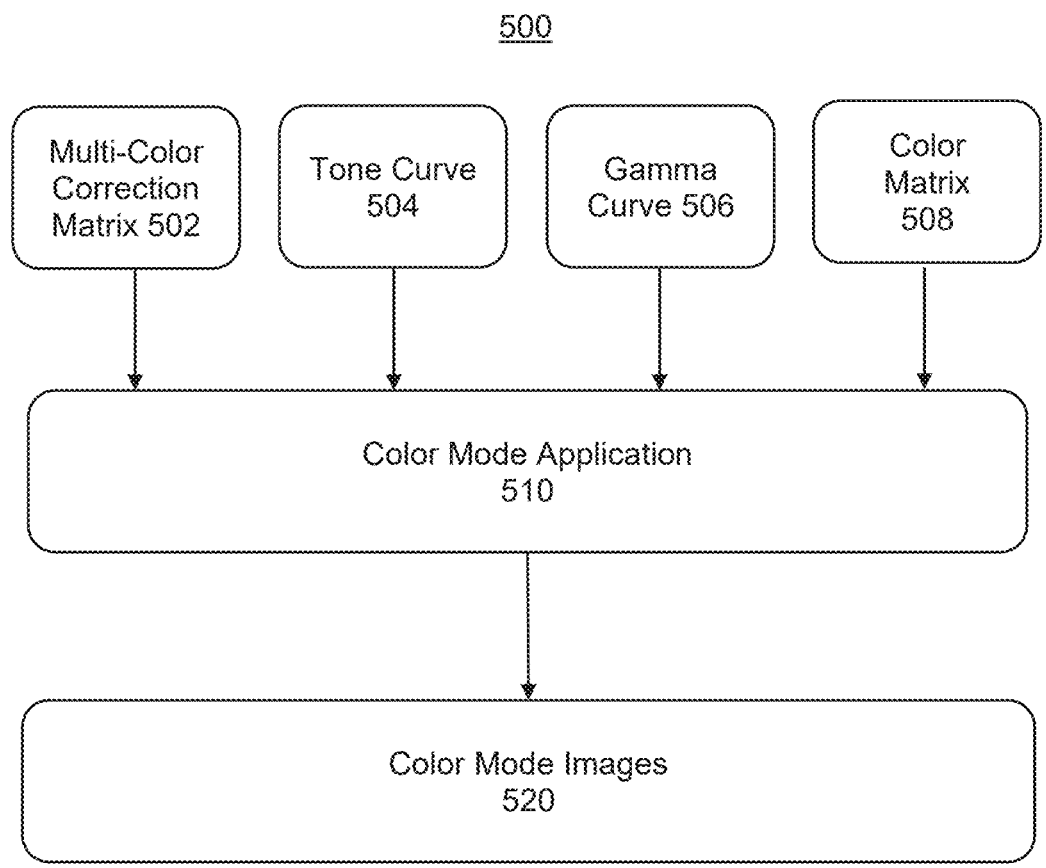
FIG. 5 illustrates an example flowchart for post-capture application of color modes.

FIG. 5 illustrates an example flowchart 500 for post-capture application of color modes. The post-capture application of color modes may be performed by an image capture device that captured the images and/or another computing device (e.g., mobile device, desktop device). For captured images, a multi-color correction matrix 502 for a color mode (e.g., desired color mode, selected color mode) to be applied, a tone curve 504, a gamma curve 506, and a color matrix 508 may be obtained. Other image processing parameters (e.g., white balance) may be obtained. The tone curve 504 may define/represent the tonal range of an image. The tone curve 504 may control the brightness and/or contrast in different tonal areas of the images. The same or different tone curve 504 may be used for different color modes. For example, the same tone curve 504 may be obtained regardless of the color mode to be applied. The tone curve 504 may depend on the scene captured within individual images. The tone curve 504 may be computed using a tone mapping tool/algorithm. The tone curve 504 may be computed from the histogram of the image, a thumbnail of the image, and/or other information. Temporal smoothing may be applied for computation of the tone curve 504. The gamma curve 506 may define/represent the relationship between a pixel value and its luminance. The gamma curve 506 may be used to distribute tonal levels within an image. The same or different gamma curve 506 may be used for different color modes. For example, the gamma curve 506 that is obtained may depend on the color mode to be applied. The gamma curve 506 may be computed based on the color mode to be applied and/or based on other parameters (e.g., light sensitivity, exposure time, color temperature). The color matrix 508 (color correction matrix) may define transformation of color values within an image to increase color reproduction. The color matrix 508 (color correction matrix) may be used to change (calibrate) the colors perceived by an image sensor into colors seen by humans. The color matrix 508 may be provided by an auto white balance tool/algorithm.

With the multi-color correction matrix 502 for the color mode, the tone curve 504, the gamma curve 506, the color matrix 508, and/or other image processing parameters, color mode application 510 may be performed. The color mode application 510 may be performed to generate color mode images 520. The color mode images 520 may include images that have been modified via the color mode application 510. An image processing parameter may refer to a parameter that controls, sets, affects, characterizes, modifies, and/or otherwise defines how visual content is processed for image generation. An image processing parameter may be static or dynamic. The color mode application 510 may be performed after the capture of images. The color mode application 510 may be performed to change the look of the captured images. The color mode application 510 may change the look of the captured images so that the captured images look as if they had been captured by the image capture device using the color mode that is applied. The color mode images 520 may include images that appear as if they had been captured by the image capture device using the color mode that is applied.

Referring back to FIG. 1, the processor 11 (or one or more components of the processor 11) may be configured to obtain information to facilitate presenting dynamic settings of an image capture device. Obtaining information may include one or more of accessing, acquiring, analyzing, determining, examining, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor, an electronic display, a touchscreen display) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate usage of multiple color modes of an image capture device. The machine-readable instructions 100 may include one or more computer program components. The machine-readable instructions 100 may include one or more of a color mode component 102, a capture component 104, a multi-color correction matrix component 106, a generation component 108, and/or other computer program components.

The color mode component 102 may be configured to operate an image capture device in different color modes. Operation of an image capture device in a given color mode may include causing the image capture device to function using the given color mode. Operation of an image capture device in a given color mode may include activating the given color mode in the image capture device. The color mode component 102 may be configured to change the operation of the image capture device between different colors modes.

A color mode of an image capture device may define a particular processing of the visual content for image generation. Different color modes may define different processing of the visual content for image generation (for presentation, for storage). Different color modes may include a first color mode, a second color mode, and/or other color modes. For example, different color modes may include vibrant color mode, flat color mode, natural color mode, log color mode, and/or other color modes.

In some implementations, operation of an image capture device in a given color mode may include setting/selection of the given color mode for generation of multi-color correction matrix. For example, a user may provide input to the system 10 (e.g., via interaction with hone or more graphical user interfaces) to set/select for which color modes the multi-color correction matrices may be generated during the capture of visual content. The multi-color correction matrices may be generated for the color modes set/selected by the user. The multi-color correction matrices may be generated for all color modes available on the image capture device. The multi-color correction matrices may be generated for all color modes available on the image capture device that utilizes a multi-color correction matrix to process visual content for image generation.

The capture component 104 may be configured to capture the visual content. The capture component 104 may be configured to start capture of the visual content and end capture of the visual content. The capture component 104 may be configured to capture the visual content during a capture duration to generate a video having a progress length. For example, the capture component 104 may be configured to capture visual content based on the visual information conveyed by the visual output signal of one or more image sensors and/or other information. Capturing the visual content may include converting light received by an image sensor/image capture device into output signals/visual information defining the visual content. Capturing the visual content may include encoding, recording, storing, and/or otherwise capturing the visual content for use in generating image(s), video(s), and/or other media items. For example, the visual content may be captured for use in generating images and/or video frames. Metadata may be captured to provide information about the visual content.

Information defining the captured content may be stored in the electronic storage 13. For example, visual information defining visual content and/or video information defining a video may be stored in the electronic storage 13. Information defining captured content may be stored in one or more tracks. For example, visual content/visual information may be stored in one or more visual tracks and metadata may be stored in one or more metadata tracks of a video.

The capture component 104 may be configured to capture the visual content based on a set of capture parameters and/or other information. The capture component 104 may be configured to capture the visual content based on the values of the set of capture parameters and/or other information. A set of capture parameters may include one or more capture parameters. A capture parameter may refer to a parameter that controls, sets, affects, characterizes, modifies, and/or otherwise defines how visual content is captured. A capture parameter may be static or dynamic. For example, the set of capture parameters may include light sensitivity, exposure time, color temperature, and/or other capture parameters. Light sensitivity may refer to sensitivity of an image sensor/image capture device to light. The value of light sensitivity (e.g., ISO) may represent the degree of sensitivity to light. Exposure time may refer to the duration of time an image sensor/image capture device is exposed to light. The value of exposure time (e.g., shutter time) may represent the duration of time the image sensor/image capture device is exposed to light. The color temperature may refer to the color characteristics of a light source (illuminant). The value of color temperature may represent the color characteristics of the light source along a spectrum (e.g., the measure of the color characteristics of the light source along a spectrum of warm to cool colors). Other capture parameters are contemplated.

The multi-color correction matrix component 106 may be configured to, during capture of the visual content, determine different multi-color correction matrices for the different color modes. Determining a multi-color correction matrix may include ascertaining, calculating, computing, establishing, finding, setting, and/or otherwise determining the multi-color correction matrix. Determining a multi-color correction matrix may include determining the structure (arrangement of values) and/or the values of the multi-color correction matrix. Different multi-color correction matrices for the different color modes may be determined based on the set of capture parameters and/or other information.

A multi-color correction matrix may be a multi-axis correlation correction matrix. A multi-color correction matrix may enable non-linear color rendering in a color space (e.g., HSV space). A multi-color correction matrix may define color transformation of an input color value to an output color value. Color transformation may include transformation (change, modification) of color values of an image. For example, a multi-color correction matrix may define how much a pixel value is to be shifted and/or rotated to match another pixel value.

Different multi-color correction matrices may be determined for different color modes. The values of a multi-color correction matrix may be determined differently for different color modes. Different rules and/or logic may be used to determine the values of different multi-color correction matrices. From the same set of capture parameters (same values of capture parameters), different values of multi-color correction matrices may be determined for different color modes. From the same values of capture parameters, different values of multi-color correction matrices may be determined for different color modes.

For example, a vibrant multi-color correction matrix may be determined for vibrant color mode while a natural multi-color correction matrix may be determined for natural color mode. In some implementations, multi-color correction matrices may not be determined for color modes that does not use a multi-color correction matrix. For example, multi-color correction matrices may not be determined for flat color mode or log color mode. In some implementations, multi-color correction matrices may be determined to not include color transformation for color modes that does not "use" a multi-color correction matrix. For example, for flat color mode or log color mode, the multi-color correction matrices may be determined to include values that do not modify the color values of an image. FIG. 4 illustrates an example flowchart 400 for multi-color correction matrix determination.

In some implementations, separate values of a multi-color correction matrix may be determined for different moments during the capture of the visual content. As the visual content is being captured, the values of the capture parameters may change. The values of a multi-color correction matrix may be recalculated for visual content of different images (e.g., individual images, individual groups of images) that are captured by the image capture device.

In some implementations, values of a multi-color correction matrix may be determined using interpolation. For example, one set of values of a multi-color correction matrix may be determined for ISO 100 and another set of values of a multi-color correction matrix may be determined for ISO 200. The values of a multi-color correction matrix for ISO 150 may be determined via interpolation between the values of the multi-color correction matrix for ISO 100 and the values of the multi-color correction matrix for ISO 200.

In some implementations, determination of different multi-color correction matrices for different color modes during the capture of the visual content may reduce the amount of information and the amount of processing needed to simulate different color modes on images. The types and/or the size of information that are needed to be saved to apply different color modes on the images may be reduced by converting the capture parameters and/or other information into the multi-color correction matrices. Determination of the different multi-color correction matrices for different color modes during the capture of the visual content enables the captured images to be modified via application of the different multi-color correction matrices.

Determination of the different multi-color correction matrices for different color modes during the capture of the visual content enables the captured images to be modified to be same as images that would have been generated using the color mode during capture. Such precise simulation of color modes on the images may not be possible without the multi-color correction matrices because the values of the multi-color correction matrices may depend on temporal aspects of the capture parameters during visual content capture. Without the multi-color correction matrices, the amount of information and/or processing that would be needed to compute the color transformation post capture may be too large.

In some implementations, different multi-color correction matrices for different color modes may be stored as image metadata. The multi-color correction matrices for different color modes may be stored in the metadata (e.g., metadata track) of the images that are stored. For example, the images may be captured as flat images (without application of a multi-color correction matrix), and the multi-color correction matrices for different color modes may be inserted into the metadata of the flat images. Such storage of the multi-color correction matrices may enable different color modes (color grading) to be accurately applied to the images after capture.

The generation component 108 may be configured to generate one or more sets of images from the captured visual content by applying one or more of the different multi-color correction matrices. A set of images may include one or more images. A set of images may be generated from the captured visual content by a multi-color correction matrix and/or other image processing parameters. In some implementations, a given set of images may form some or all video frames of a video. A multi-color correction matrix may be applied to generate some or all video frames of a video.

Applying a multi-color correction matrix/image processing parameter to visual content may include controlling, setting, affecting, characterizing, modifying, and/or otherwise defining how the visual content is processed for image generation based on the multi-color correction matrix/image processing parameter. Applying a multi-color correction matrix/image processing parameter to visual content may include modifying the visual content in accordance with the multi-color correction matrix/image processing parameter to generate images (for presentation, for storage). FIG. 5 illustrates an example flowchart 500 for post-capture application of color modes.

In some implementations, different sets of images may be generated from the captured visual content by applying different multi-color correction matrices. For example, one set of images may be generated from the captured visual content by applying one multi-color correction matrix, and another set of images may be generated from the captured visual content by applying a different multi-color correction matrix.

In some implementations, one or more the multi-color correction matrices may be applied to the visual content by the image capture device that captured the visual content to generate one or more sets of images. In some implementations, one or more the multi-color correction matrices may be applied to the visual content by another computing device (e.g., mobile device, desktop device, server) to generate one or more sets of images. For example, the computing device may obtain the visual content (e.g., visual content of flat images) captured by the image capture device and the multi-color correction matrices for the visual content. The computing device may apply one or more the multi-color correction matrices to generate one or more sets of images for different color modes of the image capture device.

In some implementations, different color modes may use different sets of image processing parameters. For example, vibrant and natural color modes may use a multi-color correction matrix, a tone curve, a gamma curve, and white balance. Flat color mode may utilize a flat gamma curve and white balance. Log color may utilize a log gamma curve and white balance.

In some implementations, one set of images may be generated by applying one multi-color correction matrix for presentation on one or more electronic displays during the capture of the visual content. Another set of images may be generated by not applying any of the different multi-color correction matrices for storage in an electronic storage. For example, a preview of the visual content being captured by the image capture device may be presented on an electronic display of the image capture device and/or an electronic display of a mobile device paired with the image capture device. The preview may be generated by applying a multi-color correction matrix and/or other image processing parameters to the visual content captured by the image capture device. For instance, vibrant or natural preview of the visual content may be presented on the electronic display(s) by applying the vibrant or natural multi-color correction matrix to the visual content as it is being captured.

Images of a different color mode may be stored in an electronic storage. The images of the different color mode that is stored in the electronic storage may be generated by not applying a multi-color correction matrix to the visual content. Not applying a multi-color correction matrix to the visual content may include not using the multi-color correction matrix in processing the visual content for image generation and/or using a multi-color correction matrix that does not modify the color values of images. For instance, while vibrant or natural preview of the visual content is presented on the electronic display(s), flat/log images of the visual content may be recorded and stored in an electronic storage.

In some implementations, a new set of images may be generated from an existing set of images by applying a different multi-color correction matrix. The existing set of images may be generated by not applying any multi-color correction matrix. For example, flat/log images may be stored in an electronic storage. The visual content of the flat/log images may be modified by applying a multi-color correction matrix of a different color mode (vibrant color mode, natural color mode). The multi-color correction matrices may be used to render the flat/log images into any color modes in post.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

While the implementations of the disclosure are described with respect to the system 10, this is merely as an example and is not meant to be limiting. In some implementation, some or all of the functionalities attributed herein to the system 10 may be performed by another system, one or more computing devices, and/or one or more processing apparatuses (e.g., tangible hardware/equipment that processes information). In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, the image sensor 15, and the electronic display 16 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
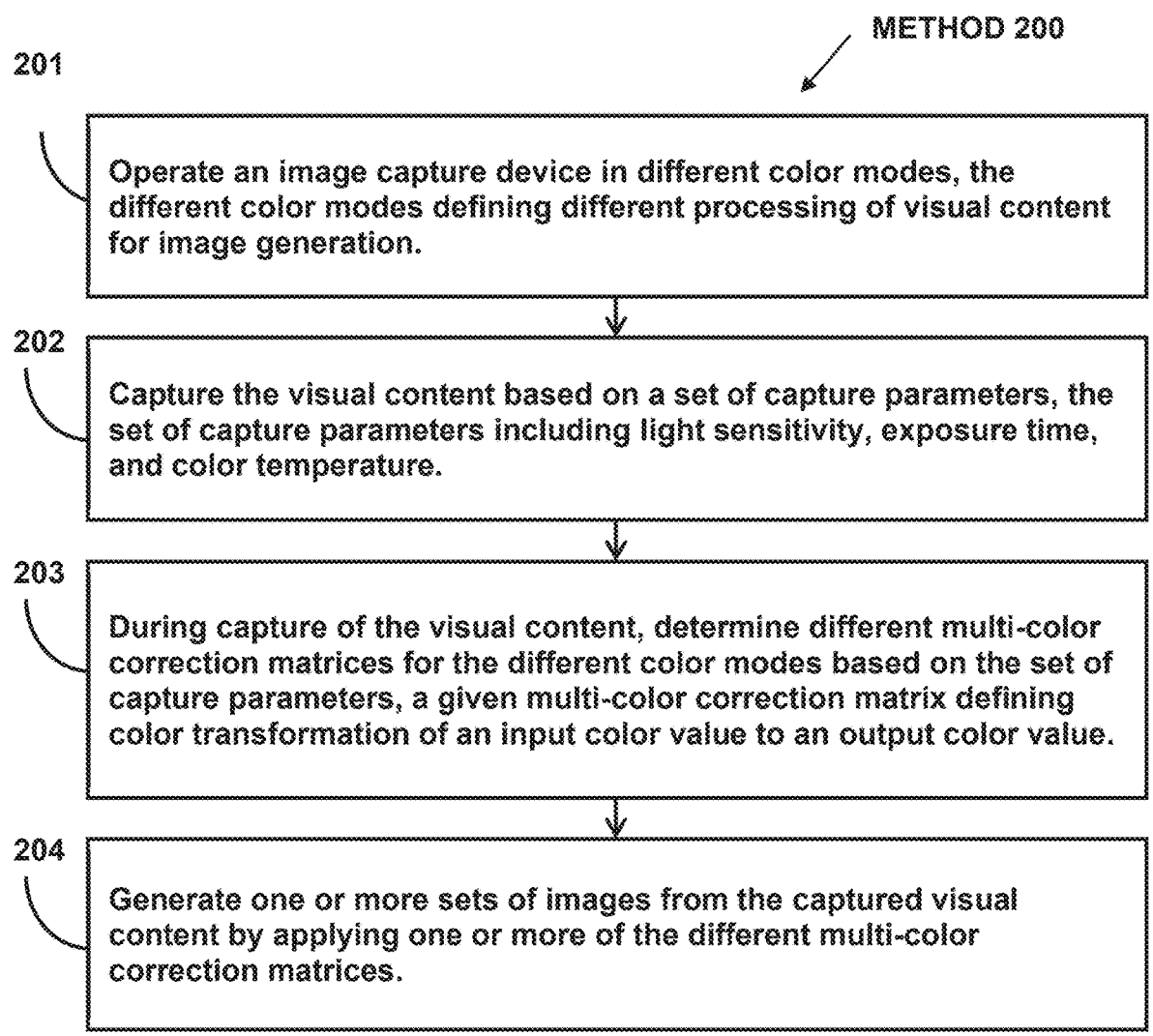
FIG. 2 illustrates an example method for facilitating usage of multiple color modes of an image capture device.

FIG. 2 illustrates method 200 for facilitating usage of multiple color modes of an image capture device. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, an image capture device may include a housing. The housing may carry one or more of an optical element, an image sensor, and/or other components. The optical element may guide light within a field of view to the image sensor. The image sensor may generate a visual output signal conveying visual information based on light that becomes incident thereon. The visual information may define visual content.

At operation 201, the image capture device may be operated in different color modes. The different color modes may define different processing of the visual content for image generation. The different color modes may include a first color mode, a second color mode, and/or other color modes. In some implementations, operation 201 may be performed by a processor component the same as or similar to the color mode component 102 (Shown in FIG. 1 and described herein).

At operation 202, the visual content may be captured based on a set of capture parameters. The set of capture parameters may include light sensitivity, exposure time, color temperature, and/or other capture parameters. In some implementations, operation 202 may be performed by a processor component the same as or similar to the capture component 104 (Shown in FIG. 1 and described herein).

At operation 203, during capture of the visual content, different multi-color correction matrices may be determined for the different color modes based on the set of capture parameters and/or other information. A given multi-color correction matrix may define color transformation of an input color value to an output color value. A first multi-color correction matrix is determined for the first color mode, a second multi-color correction matrix is determined for the second color mode, and/or other multi-color correction matrices may be determined for other color modes. In some implementations, operation 203 may be performed by a processor component the same as or similar to the multi-color correction matrix component 106 (Shown in FIG. 1 and described herein).

At operation 204, a set of images may be generated from the captured visual content by applying one or more of the different multi-color correction matrices. In some implementations, operation 204 may be performed by a processor component the same as or similar to the generation component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An image capture device with multiple color modes, the image capture device comprising:

a housing;

an optical element carried by the housing and configured to guide light within a field of view to an image sensor;

the image sensor carried by the housing and configured to generate a visual output signal conveying visual information based on light that becomes incident thereon, the visual information defining visual content; and one or more physical processors carried by the housing and configured by machine-readable instructions to:

operate the image capture device in different color modes, the different color modes defining different processing of the visual content for image generation, the different color modes including a first color mode and a second color mode;

capture the visual content based on a set of capture parameters, the set of capture parameters including light sensitivity, exposure time, and color temperature;

during capture of the visual content, determine different multi-color correction matrices for the different color modes based on the set of capture parameters, a given multi-color correction matrix defining color transformation of an input color value to an output color value, wherein a first multi-color correction matrix is determined for the first color mode and a second multi-color correction matrix is determined for the second color mode, wherein determination of the different multi-color correction matrices for the different color modes during the capture of the visual content reduces amount of information and amount of processing needed to simulate different color modes on images; and generate multiple sets of images from the captured visual content by applying multiple ones of the different multi-color correction matrices, wherein a first set of images is generated from the captured visual content by applying the first multi-color correction matrix and a second set of images is generated from the captured visual content by applying the second multi-color correction matrix.

2. The image capture device of claim 1, wherein a given set of images form some or all video frames of a video;

the first set of images generated by applying the first multi-color correction matrix is presented on an electronic display during the capture of the visual content; and a third set of images generated by not applying any of the different multi-color correction matrices is stored in an electronic storage.

3. An image capture device with multiple color modes, the image capture device comprising:

a housing;

an optical element carried by the housing and configured to guide light within a field of view to an image sensor;

the image sensor carried by the housing and configured to generate a visual output signal conveying visual information based on light that becomes incident thereon, the visual information defining visual content; and one or more physical processors carried by the housing and configured by machine-readable instructions to:

operate the image capture device in different color modes, the different color modes defining different processing of the visual content for image generation, the different color modes including a first color mode and a second color mode;

capture the visual content based on a set of capture parameters, the set of capture parameters including light sensitivity, exposure time, and color temperature;

during capture of the visual content, determine different multi-color correction matrices for the different color modes based on the set of capture parameters, a given multi-color correction matrix defining color transformation of an input color value to an output color value, wherein a first multi-color correction matrix is determined for the first color mode and a second multi-color correction matrix is determined for the second color mode; and generate one or more sets of images from the captured visual content by applying one or more of the different multi-color correction matrices.

4. The image capture device of claim 3, wherein:

different sets of images are generated from the captured visual content by applying different multi-color correction matrices;

a first set of images is generated from the captured visual content by applying the first multi-color correction matrix; and a second set of images is generated from the captured visual content by applying the second multi-color correction matrix.

5. The image capture device of claim 3, wherein:

a first set of images is generated by applying the first multi-color correction matrix for presentation on an electronic display during the capture of the visual content; and a second set of images is generated by not applying any of the different multi-color correction matrices for storage in an electronic storage.

6. The image capture device of claim 3, wherein a new set of images is generated from an existing set of images by applying a different multi-color correction matrix.

7. The image capture device of claim 6, wherein the existing set of images is generated by not applying any multi-color correction matrix.

8. The image capture device of claim 3, wherein determination of the different multi-color correction matrices for the different color modes during the capture of the visual content reduces amount of information and amount of processing needed to simulate different color modes on images.

9. The image capture device of claim 3, wherein separate values of the given multi-color correction matrix is determined for different moments during the capture of the visual content.

10. The image capture device of claim 3, wherein the different multi-color correction matrices for the different color modes are stored as image metadata.

11. The image capture device of claim 3, wherein a given set of images form some or all video frames of a video.

12. A method for utilizing multiple color modes of an image capture device, the method performed by an image capture device including an optical element, an image sensor, and one or more processors, the optical element configured to guide light within a field of view to the image sensor, the image sensor configured to generate a visual output signal conveying visual information based on light that becomes incident thereon, the visual information defining visual content, the method comprising:

operating the image capture device in different color modes, the different color modes defining different processing of the visual content for image generation, the different color modes including a first color mode and a second color mode;

capturing the visual content based on a set of capture parameters, the set of capture parameters including light sensitivity, exposure time, and color temperature;

during capture of the visual content, determining different multi-color correction matrices for the different color modes based on the set of capture parameters, a given multi-color correction matrix defining color transformation of an input color value to an output color value, wherein a first multi-color correction matrix is determined for the first color mode and a second multi-color correction matrix is determined for the second color mode; and generating one or more sets of images from the captured visual content by applying one or more of the different multi-color correction matrices.

13. The method of claim 12, wherein:

different sets of images are generated from the captured visual content by applying different multi-color correction matrices;

a first set of images is generated from the captured visual content by applying the first multi-color correction matrix; and a second set of images is generated from the captured visual content by applying the second multi-color correction matrix.

14. The method of claim 12, wherein:

a first set of images is generated by applying the first multi-color correction matrix for presentation on an electronic display during the capture of the visual content; and a second set of images is generated by not applying any of the different multi-color correction matrices for storage in an electronic storage.

15. The method of claim 12, wherein a new set of images is generated from an existing set of images by applying a different multi-color correction matrix.

16. The method of claim 15, wherein the existing set of images is generated by not applying any multi-color correction matrix.

17. The method of claim 12, wherein determining the different multi-color correction matrices for the different color modes during the capture of the visual content reduces amount of information and amount of processing needed to simulate different color modes on images.

18. The method of claim 12, wherein separate values of the given multi-color correction matrix is determined for different moments during the capture of the visual content.

19. The method of claim 12, wherein the different multi-color correction matrices for the different color modes are stored as image metadata.

20. The method of claim 12, wherein a given set of images form some or all video frames of a video.

* * * * *